(12) United States Patent
Zhou et al.

(10) Patent No.: US 10,949,618 B2
(45) Date of Patent: Mar. 16, 2021

(54) CONVERSATION CONTENT GENERATION BASED ON USER PROFESSIONAL LEVEL

(71) Applicant: International Business Machines Corporation, Armonk, NY (US)

(72) Inventors: Xin Zhou, Beijing (CN); Qi Cheng Li, Beijing (CN); Jian Wang, Beijing (CN); Li Jun Mei, Beijing (CN); Hao Chen, Beijing (CN); Shao Chun Li, Beijing (CN); Ya Bin Dang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 16/190,473

(22) Filed: Nov. 14, 2018

(65) Prior Publication Data

US 2020/0151256 A1     May 14, 2020

(51) Int. Cl.
*G06F 40/30*     (2020.01)
*G06N 5/02*     (2006.01)
*G06F 16/2452*     (2019.01)

(52) U.S. Cl.
CPC ........ *G06F 40/30* (2020.01); *G06F 16/24522* (2019.01); *G06N 5/022* (2013.01)

(58) Field of Classification Search
CPC .... G06F 40/30; G06F 16/24522; G06N 5/022
See application file for complete search history.

(56) References Cited

U.S. PATENT DOCUMENTS

| 8,930,224 B2 | 1/2015 | Heywood et al. |
| 9,298,766 B2 | 3/2016 | Kozloski et al. |
| 2015/0370980 A1 | 12/2015 | Sun |
| 2016/0180216 A1* | 6/2016 | Allen ...................... G09B 7/02 706/46 |
| 2018/0218127 A1* | 8/2018 | Salazar .................. G16H 50/30 |
| 2019/0051392 A1* | 2/2019 | Givoly ................ G06F 16/2457 |

FOREIGN PATENT DOCUMENTS

CN     105912846 A     8/2016

OTHER PUBLICATIONS

Drew et al., "Conversation analysis: a method for research into interactions between patients and health-care professionals," 2001, Health Expectations, pp. 58-70, Blackwell Science Ltd, 13 pages.
Mell et al., "The NIST Definition of Cloud Computing," National Institute of Standards and Technology, Sep. 2011, Special Publication 800-145, U.S Department of Commerce, 7 pages.

* cited by examiner

*Primary Examiner* — Michelle M Koeth
(74) *Attorney, Agent, or Firm* — Amin, Turocy & Watson, LLP

(57) ABSTRACT

The present disclosure provides a method, computer system and computer program product facilitating generation of a conversation content. A computer-implemented method comprises: obtaining, by a device operatively coupled to one or more processors, history conversation data of an user; determining, by the device, a professional level of the user based on the history conversation data; and generating, by the device, a conversation content for the user based on the professional level of the user.

17 Claims, 5 Drawing Sheets

600

700

US 10,949,618 B2

CONVERSATION CONTENT GENERATION BASED ON USER PROFESSIONAL LEVEL

BACKGROUND

The present disclosure relates to intelligent conversation technologies, and more specifically, to generation of conversation contents based on user professional levels.

SUMMARY

According to one embodiment of the present invention, there is provided a computer-implemented method that generates a conversation content. The computer-implemented method comprises: obtaining, by a device operatively coupled to one or more processors, history conversation data of a user; determining, by the device, a professional level of the user based on the history conversation data; and generating, by the device, a conversation content for the user based on the professional level of the user.

According to another embodiment of the present invention, there is provided a computer system. The computer system comprises a memory that stores computer executable components; and a processor, operably coupled to the memory, and that executes the computer executable components stored in the memory. At least one of the computer-executable components: obtains history conversation data of a user; determines a professional level of the user based on the history conversation data; and generates a conversation content for the user based on the professional level of the user.

According to another embodiment of the present invention, there is provided a computer program product facilitating generation of conversation contents based on user professional levels. The computer program product comprises a computer readable storage medium having program instructions embodied therewith, the program instructions executable by a processor to cause the processor to: obtain, by the processor, history conversation data of a user; determine, by the processor, a professional level of the user based on the history conversation data; and generate, by the processor, a conversation content for the user based on the professional level of the user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
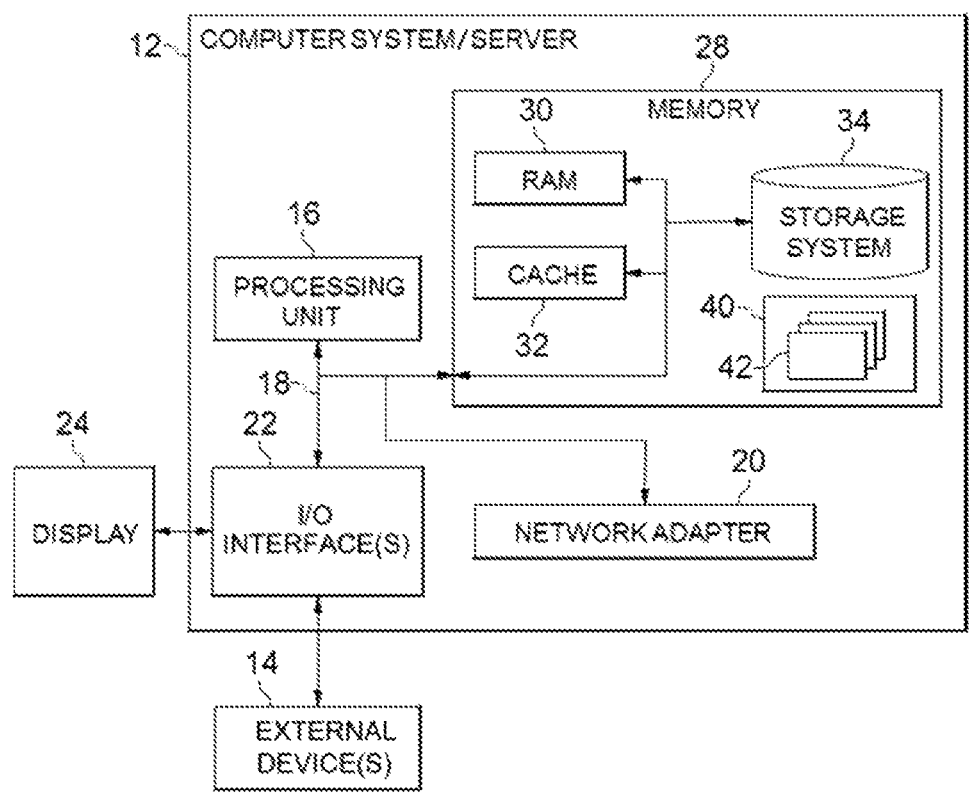
FIG. 1 depicts a cloud computing node in accordance with one or more embodiments described herein.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
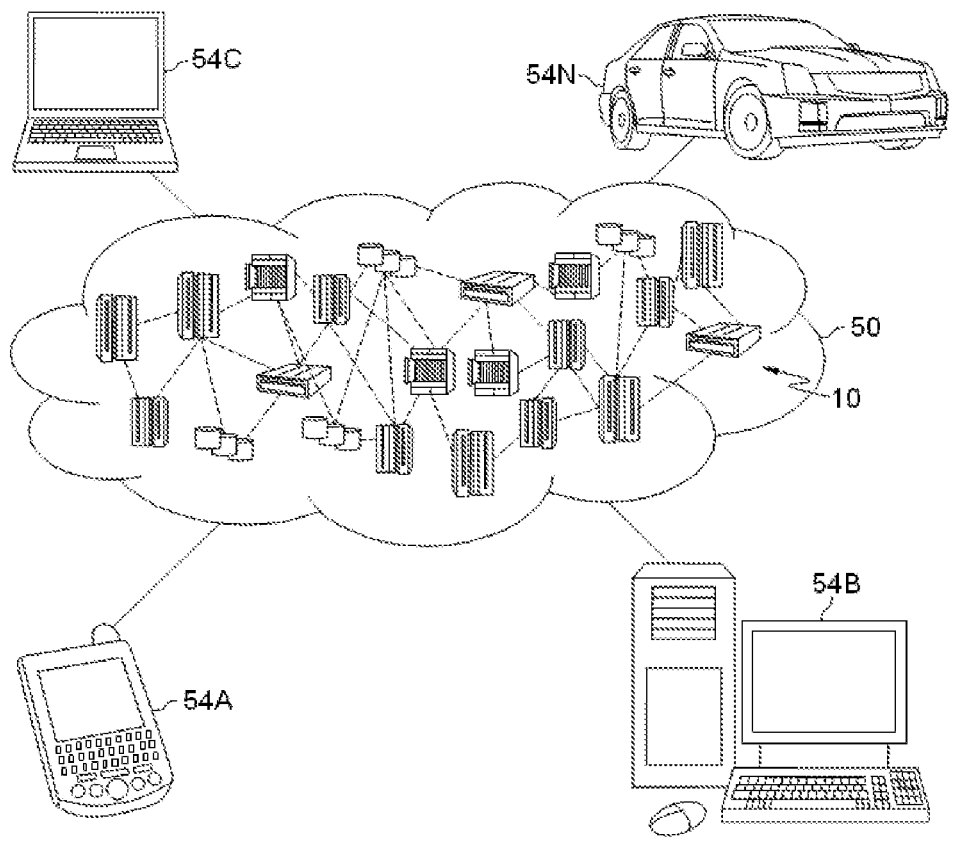
FIG. 2 depicts a cloud computing environment in accordance with one or more embodiments described herein.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
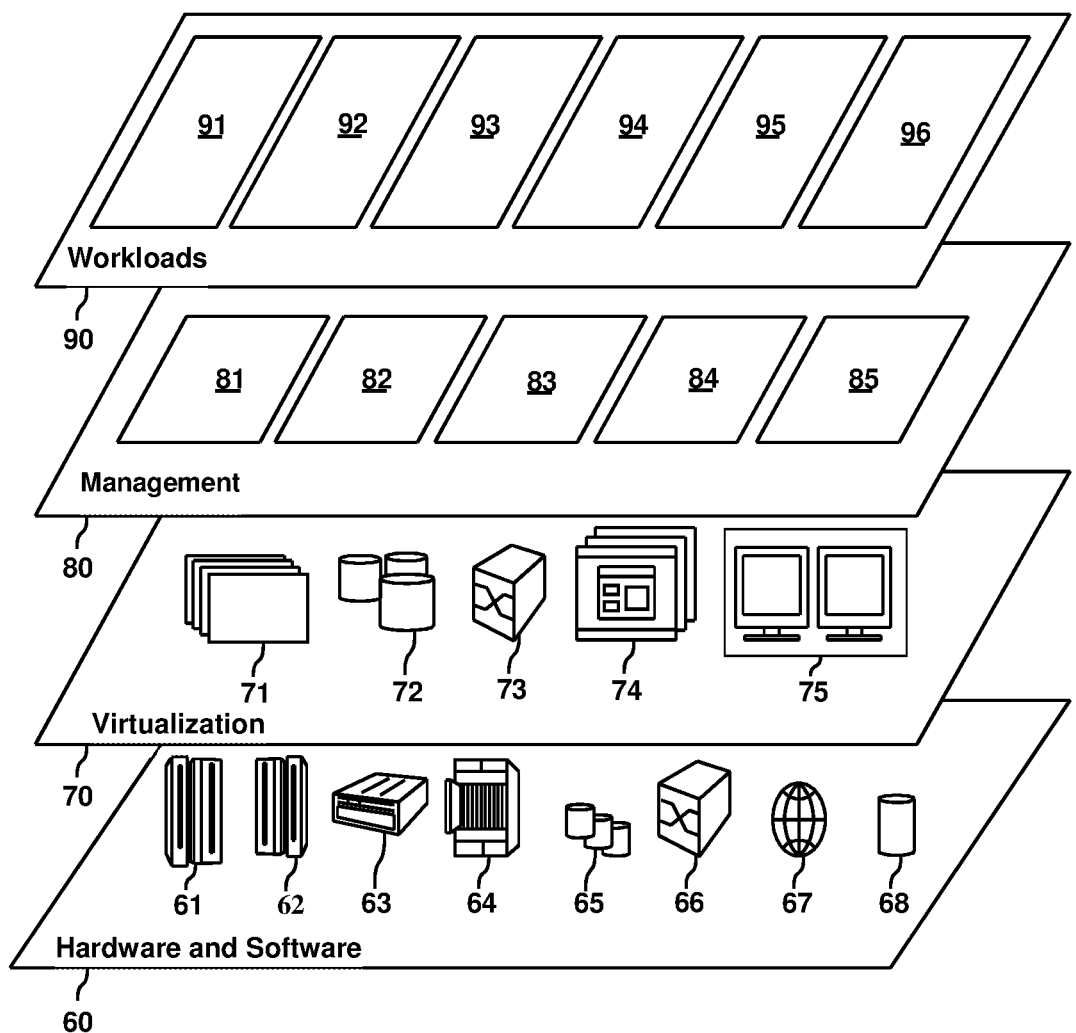
FIG. 3 depicts abstraction model layers in accordance with one or more embodiments described herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conversation content generation based on user professional level 96.

Intelligent conversation systems are widely used in many fields. Users can input their questions to the intelligent conversation systems and receive feedbacks from the intelligent conversation systems.

For example, a conversation system can be used to receive symptom descriptions from users (for example, patients) and provide medical advice to the users. The conversation system collects symptom descriptions for further analysis. The symptom descriptions can also be used by a doctor. The users may have different levels of medical knowledge, and they may have different preference on describing symptoms and consuming medical advice.

Intelligent conversation systems have become increasingly popular. Intelligent conversation systems (e.g., conversation systems based on natural languages) provide convenient interaction between users and the systems. As used herein, the term "user" can include a machine, robot, artificial intelligence-driven device comprised of hardware and/or software (e.g., computer program products, non-transitory computer-readable storage media, etc.) or a combination of the same, or a human. The users can input inquiries through an audio interface provided by the intelligent conversation systems and receive audio output from the intelligent conversation systems.

Embodiments of the invention provide methods, computer systems, and computer program products that generates conversation contents based on user professional levels.

It shall be understood that the computer-based conversation system that provides medical advice is used as an example to describe principles of one or more embodiments of the invention. The embodiments of the invention are not limited to the system that provides medical advice, and the methods, computer systems, and computer program products provided by the embodiments of the invention can also be applied in many other intelligent computer-based conversation systems, such as conversation systems that provide technique advice, legal advice, insurance or banking advice, etc.

Figure 4:
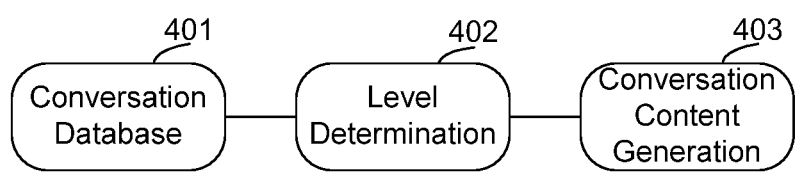
FIG. 4 depicts a schematic diagram of an example conversation system in accordance with one or more embodiments described herein.

With reference now to FIG. 4, a schematic diagram of an example conversation system 400 in accordance with one or more embodiments described herein is illustrated. In some embodiments, conversation system 400 can be computer system/server 12 of FIG. 1.

Conversation system 400 can be used to provide medical advice to a user. Conversation system 400 can comprise Conversation Database 401, Level Determination Module 402, and Conversation Content Generation Module 403. Conversation system 400 can also comprise a user interface (not shown in FIG. 4) that can receive inputs from a user and provide output to the user. The user interface can comprise a keyboard, a mouse, a touch screen, a microphone, a camera, a displayer, a speaker, etc. The user interface can also comprise other input and/or output devices now known or to be developed. It shall be understood that the above-mentioned modules are just for describing principles of the present invention. Other modules can also be comprised in conversation system 400, and one or more of above-mentioned modules can be combined with another of the above-mentioned modules to generate a combined module or divided into a plurality of submodules.

A user can access conversation system 400 and input information describing symptoms of the user through the user interface of conversation system 400. The inputs from the user and outputs of conversation system 400 can be referred to conversation data hereinafter. The conversation data can comprise texts, videos, or audios, etc. It shall be understood that other types of contents can also be comprised in the conversation data. The conversation data of the user can be recorded in Conversation Database 401.

In some examples, the user can describe some symptoms first, and then conversation system 400 can generate a further inquiry for the user. In some other examples, conversation system 400 can ask the user some general questions, receive answers to the general questions from the user, and then generate a further inquiry for the user.

For example, a question "What is the symptom that is troubling you the most?" can be shown on a screen of conversation system 400 or voiced out by a speaker of conversation system 400. The user can read or hear the question. The user can input a text, audio, or video content through the user interface of conversation system 400 as an answer to the question. The answer from the user can be Example Answer 1 in text format "I had a fever for a long time." or Example Answer 2 in text format "I had a fever for 2 days, the highest body temperature is 39.4 degree, and the lowest body temperature is 38.5 degree.", etc. Example Answer 1 or Example Answer 2 can be saved in Conversation Database 401.

Figure 5:
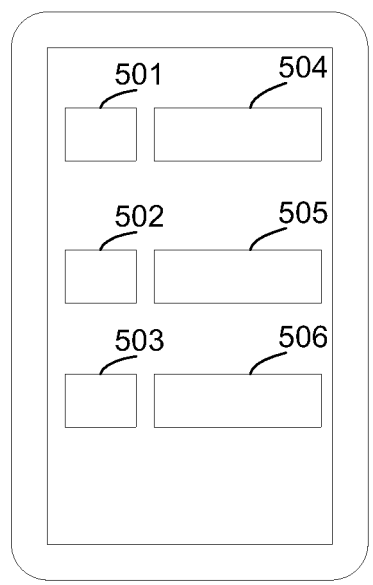
FIG. 5 depicts a schematic diagram of an example device in accordance with one or more embodiments described herein.

Referencing now FIG. 5, an example device 500 in accordance with one or more embodiments described herein is illustrated. In a pre-diagnosis period, a plurality of questions, such as questions 501, 502 and 503, can be provided by conversation system 400 and then presented to the user on the device 500. Herein, the term "pre-diagnosis period" can mean a period after the user starts to access conversation system 400 for inquiring a disease and before the user stops the access. In some embodiments, device 500 is a display device comprised in conversation system 400.

The user can read questions 501, 502 and 503 using device 500, and then input contents 504, 505 and 506 as answers to questions 502, 506 and 510. The user can use a plurality of input methods to input contents 504, 505 and 506, such as keyboard input methods, voice input methods, etc. Questions 501, 502, 503 and contents 504, 505, 506 can be saved in Conversation Database 401 as conversation data of the user.

According to embodiments of the invention, history conversation data of the user can be obtained by Level Determination Module 402 from Conversation Database 401. The obtained history conversation data can comprise conversation data of the user in previous pre-diagnosis periods, or conversation data of the user in current pre-diagnosis period before determination of a professional level of the user.

According to embodiments of the invention, a professional level of the user can be determined by Level Determination Module 402 based on the history conversation data obtained from Conversation Database 401. The determined professional level of the user can further be saved by Level Determination Module 402 in a professional level database.

One or more symptoms can be extracted from the obtained history conversation data using natural language processing technologies now known or to be developed. One or more description sections used by the user for describing each of the one or more symptoms can also be determined after analysis of obtained history conversation data. Then weights can be assigned to the one or more description sections. A score for each symptom can be calculated based on the weights of the sections. Scores for the one or more symptoms are used to represent the professional level of the user on the one or more symptoms.

For each of the one or more symptoms, one or more description sections used by the user for describing each symptom can be compared with a standard language pattern for describing the symptoms. The standard language pattern of the symptoms can be description manners of the symptoms obtained from a standard language pattern database. The standard language pattern can also be obtained after analyzing terms or descriptions used by professionals (such as, doctors) using natural language processing technologies and/or machine learning technologies, etc. The standard language pattern can comprise using professional terms for describing names, degrees, durations, positions, etc. of the symptoms. The standard language pattern can also comprise using accurate values for describing degrees, durations, positions, etc. of the symptoms. If a description section used by the user for describing a symptom matches with a standard language pattern, a first weight can be assigned to the section. If another description section does not match with a standard language pattern of the symptoms, a second weight can be assigned to the another description section. The first weight is greater than the second weight.

As an example, the obtained history conversation data comprises Example Answer 1 "I had a fever for a long time.". Example Answer 1 can be analyzed to extract one or more symptoms. In this example, a symptom Fever can be extracted from Example Answer 1. One or more description sections used by the user for describing the symptom Fever can be determined based on Example Answer 1 using natural language processing technologies. As the description section "fever" extracted from Example Answer 1 matches with a standard language pattern for representing the name of the symptom Fever (i.e. a pattern using professional names), so a weight "1" can be assigned to the description section "fever". As the description section "a long time" does not match with a standard language pattern for representing the duration of the symptom Fever (i.e. a pattern using accurate values), a weight "0.5" can be assigned to the description section "a long time". Table 1 is an example table recording the description sections of the symptom Fever of Example Answer 1 and corresponding weights.

TABLE 1

| Description Section | Weight |
|---|---|
| fever | 1 |
| a long time | 0.5 |

A score for the symptom "Fever" can be calculated based on the assigned weights. For example, the score for the symptom "fever" can be calculated using the following formulae:

$$UP = \frac{\sum_{k=1}^{A} a_k}{A},$$

wherein UP represents the score for the symptom "Fever", A is the number of description sections for describing for the symptom "Fever" extracted based on the history conversation data, $a_k$ is the weight assigned to the description section k ($1 \leq k \leq A$). In the example of Table 1, the score can be calculated as $$\frac{1+0.5}{2} = 0.75.$$

It shall be understood that the above-mentioned weights (e.g., 1 and 0.5) and the method for calculating the score for the symptom are used to describe principles of the invention, other suitable weights for the description sections and methods to calculate the score for the symptom can also be applied. The weights can be set by Level Determination Module 402.

As another example, the obtained history conversation data comprises Example Answer 2 "I had a fever for 2 days, the highest body temperature is 39.4 degree, and the lowest body temperature is 38.5 degree.". Example Answer 2 can be analyzed to determine one or more symptoms, and a symptom Fever can be extracted from Example Answer 2. One or more description sections used by the user for describing the symptom Fever can be determined based on Example Answer 2 using natural language processing technologies. Table 2 is an example table recording the description sections of the symptom Fever of Example Answer 2 and corresponding weights.

TABLE 2

| Description Section | Weight |
| --- | --- |
| fever | 1 |
| 2 days | 1 |
| the highest body temperature is 39.4 degree, the lowest body temperature is 38.5 degree | 1 |

The description section "fever" in Table 2 matches with a standard language pattern for representing the name of the symptom Fever (i.e. a pattern using professional names), so a weight "1" can be assigned to the description section "fever". As the description section "2 days" matches with a standard language pattern for representing the duration of symptom Fever (i.e. a pattern using accurate values), a weight "1" can be assigned to the description section "2 days". As the description section "the highest body temperature is 39.4 degree, the lowest body temperature is 38.5 degree" also matches with a standard language pattern for representing degree of symptom Fever (i.e. a pattern using accurate values), a weight "1" can be assigned. A score for the symptom Fever can be calculated based on the assigned weights. In this example, the score can be calculated as $$\frac{1+1+1}{3} = 1.$$

As another example, the obtained history conversation data comprises Example Answer 1 "I had a fever for a long time." and Example Answer 3 "I had a headache for 24 hours, and the headache locates on both sides of my head.". Two symptoms Fever and Headache can be extracted from the history conversation data. Table 3 is an example table recording the description sections of the symptom "Headache" of Example Answer 3 and corresponding weights. As description sections "headache" and "24 hours" match with a standard language pattern for representing the name and the duration of symptom Headache (i.e. a pattern using professional terms and accurate values), weight "1" can be assigned to these description sections. As description section "both sides" does not match with a standard language pattern for representing positions of symptom "Headache" (i.e. a pattern using accurate values), weight "0.5" can be assigned to the description section.

TABLE 3

| Description Section | Weight |
| --- | --- |
| headache | 1 |
| 24 hours | 1 |
| both sides | 0.5 |

In this example, the score for the symptom Fever can be calculated using the above-mentioned methods, and the calculated score is $$\frac{1+0.5}{2} = 0.75.$$

The score for the symptom Headache can also be calculated using the above-mentioned methods, and the calculated score is $$\frac{1+1+0.5}{3} \approx 0.83.$$

In some embodiments, the professional level of the user can be represented as symptoms and scores of the symptoms. For example, the professional level of the user can be represented as: Fever, 0.75; Headache, 0.83.

In some other embodiments, the professional level of the user can be represented using a mean value of the scores for the one or more symptoms. For example, if the score for Fever is 0.5 and the score for Headache is 0.83, the professional level of the user can be determined as (0.75+0.83)/2=0.79.

In some other embodiments, the professional level of the user can be represented using a weighted sum of the scores for the one or more symptoms. Weights can be assigned to the scores for the one or more symptoms based on the time points when the user inputs contents related to the symptoms. If a first symptom is more recent than a second symptom, a weight assigned to the score of the first symptom can be greater than a weight assigned to the score of the second symptom. For example, if contents related to symptom Fever were inputted by the user 1 month ago, and contents related to symptom Headache were inputted by the user just in 1 day, the weight assigned to the score of symptom Headache (for example, 0.8) is greater than the weight assigned to the score of symptom Fever (for example, 0.2). In this example, if the score for Fever is 0.5 and the score for Headache is 0.83, the professional level of the user can be determined as 0.5*0.2+0.83*0.8≈0.76.

The determined professional level of the user on a symptom can be saved by Level Determination Module 402 in a professional level database. If a previous professional level of the user on the symptom can be found in the professional level database, the determined professional level of the user on the symptom can replace the previous professional level of the user on the symptom.

In some other examples, professional levels of the user on a symptom determined in different times can be weighted to obtain a weighted professional level of the user on the symptom. Then, the weighted professional levels of the user on the symptom can be used to represent the professional level of the user on the symptom and saved in the professional level database.

According to embodiments of the invention, a conversation content can be generated for the user based on the professional level of the user by Conversation Content Generation Module 403. The generated conversation content can be provided to the user by conversation system 400.

In some embodiments, a language pattern can be selected based on the professional level of the user, and the generated conversation content comprises advice described in the selected language pattern. For example, if the professional level of the user is higher than a preset threshold, a standard language pattern can be selected, and professional terms can be used to describe the advice. In contrast, an easy language pattern can be selected if the professional level of the user is not higher than the preset threshold, and common terms and/or explanations which will be easily understood by the user can be used in the generated conversation content. It shall be understood that terms can be organized to form the advice using known technologies.

For example, if the user inputs "I had a fever for a long time." in current pre-diagnosis period, as the professional level of the user is determined to be 0.75, which is lower than a preset threshold (for example, 0.8), a medical advice will be described in an easy language pattern and provided to the user. In this easy language pattern, common terms and/or explanations will be used in the generated medical advice, and professional terms not familiar by common patients will not be used.

In some other embodiments, after obtaining current known symptoms (for example, current symptom set S1) in a pre-diagnosis period, possible diseases (for example, disease set D) can be determined based on relationships between symptoms and diseases. The relationships between symptoms and diseases can be obtained by analyzing known symptoms of known diseases. The relationships between symptoms and diseases can also be obtained based on input from medical experts. The possibility of each of the diseases can be determined. If the possibility of a disease in the set D is higher than a preset threshold, the disease can be explained to the user using the selected language pattern. Advice can also be provided to the user using the selected language pattern. The preset threshold can be set by conversation system 400.

Table 4 is an example table showing relationships between diseases and symptoms in accordance with one or more embodiments described herein. In Table 4, Disease A relates to Symptoms 1, 2 and 3, Disease B relates to Symptom 1, Symptom 2 and Symptom 4, Disease C relates to Symptom 1 and Symptom 5, and Disease D relates to Symptom 1 and Symptom 6. In a pre-diagnosis period, if it is determined that the user has Symptoms 1, 2 and 3 based on the obtained conversation data, the possibility of Disease A can be determined as 1, and description and/or advice for Disease A can be explained to the user by Conversation Content Generation Module 403 using the selected language pattern.

TABLE 4

| Disease | Symptom(s) |
| --- | --- |
| Disease A | Symptom 1, Symptom 2, Symptom 3 |
| Disease B | Symptom 1, Symptom 2, Symptom 4 |
| Disease C | Symptom 1, Symptom 5 |
| Disease D | Symptom 1, Symptom 6 |

In some other embodiments, the generated conversation content can comprise a further inquiry provided to the user for inquiring a further symptom. Embodiments of the invention provide manners to determine the further symptom.

The further symptom can be determined based on current known symptoms in a pre-diagnosis period and professional levels of the user on evaluated symptoms in current and previous pre-diagnosis periods. A predicted professional level of the user on the further symptom can be determined, and then a language pattern can be selected based on the predicted professional level of the user on the further symptom to describe the further symptom. The conversation content is generated by Conversation Content Generation Module 403 to describe the further symptom using the selected language pattern. For example, if the predicted professional level of the user on the further symptom is higher than a preset/defined threshold, a standard language pattern can be selected, and the further symptom will be described using professional terms comprised in or suggested by the standard language pattern. In contrast, if the predicted professional level of the user on the further symptom is not higher than the preset threshold, an easy language pattern can be selected, and the further symptom will be described using common terms and/or explanations which will be easily understood by ordinary people.

Referencing back to Table 4, in a pre-diagnosis period, if it is determined the user has Symptom 1 based on the conversation data from the user in the current pre-diagnosis period, Diseases A, B, C, or D possibly appears, and the possible disease set D comprises Diseases A, B, C and D. Candidate symptoms to be inquired by conversation system 400 with the user can be determined based on the relationships between diseases and symptoms. In the example of Table 4, current symptom set S1 comprises Symptom 1, and candidate symptom set S2 comprises Symptom 2, Symptom 3, Symptom 4, Symptom 5, and Symptom 6.

Figure 6:
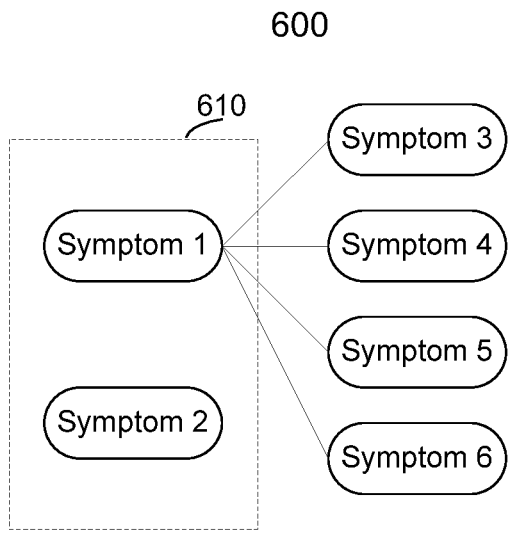
FIG. 6 depicts a schematic diagram of an example mapping between symptoms in accordance with one or more embodiments described herein.

Referencing now FIG. 6, an example mapping 600 between evaluated symptoms and other symptoms in accordance with one or more embodiments described herein is illustrated. For example, evaluated symptom set 610 can comprise Symptom 1 which is evaluated based on inputs from the user in current pre-diagnosis period, and Symptom 2 which is evaluated in previous pre-diagnosis periods. Professional levels of the user on Symptom 1 and Symptom 2 are obtained using the methods provided by the invention. In FIG. 6, if a symptom in evaluated symptom set 610 and another symptom non-evaluated relate to a same disease, there is a link between these two symptoms. For example, Symptom 1 and Symptom 3 both relate to a disease (such as, Disease A), there is a link between Symptoms 1 and 2.

As an example, as the professional level of the user on Symptom 2 is obtained based on inputs from the user in previous pre-diagnosis periods, the predicted professional level of the user on Symptom 2 in the current pre-diagnosis period can be set as same to previous professional level of the user on Symptom 2 obtained in previous pre-diagnosis periods.

As a further example, as the professional level of the user on a evaluated symptom in the evaluated symptom set 610 (Symptom 1 or Symptom 2) is determined, the predicted professional level of the user on a symptom non-evaluated (Symptom 3, Symptom 4, Symptom 5, or Symptom 6) can be inversely proportional to distances between the non-evaluated symptom (Symptom 3, Symptom 4 or Symptom 5) and the evaluated symptom (Symptom 1 or Symptom 2). The distances between the non-evaluated symptom (Symptom 3, Symptom 4, Symptom 5, or Symptom 6) and the evaluated symptom (Symptom 1 or Symptom 2) can be represented by the hop number of the link between them.

As a further example, the predicted professional level of the user on a non-evaluated symptom can be calculated as $$PS(x) = \frac{1}{2^d} * PS,$$

wherein PS(x) represent the predicted professional level of the user on a non-evaluated symptom x, d is the distance between the non-evaluated symptom x and an evaluated symptom in the evaluated symptom set 610, PS is the professional level of the user on the evaluated symptom, and d is the distance between the evaluated symptom and symptom x. If there are multiple evaluated symptoms in set 610, PS(x) can be calculated for each of the evaluated symptom, and then a mean value or a weighted sum of the multiple PS(x) can be calculated to represent the predicted professional level of the user on symptom x. As an example, if the professional level of the user on Symptom 1 is determined to be 1, as the distance between Symptom 1 and Symptom 3 is 1, the predicted professional level of the user on Symptom 3 can be determined to be 0.5.

In some embodiments, if a predicted professional of the user on a symptom is larger than a preset threshold, the symptom can be set as the further symptom. As an example, the preset threshold can be set by Conversation Content Generation Module 403. In these embodiments, the predicted professional level of the user on Symptom 2 can be directed obtained from Conversation Database 401, and the predicted professional levels of the user on Symptom 3 and Symptom 4 can be determined using the above-mentioned methods.

In some other embodiments, if a predicted professional of the user on a first symptom is larger than a predicted professional of the user on each of other symptoms in the candidate symptom set S2, the first symptom can be set as the further symptom. For example, if it is determined that the user has Symptom 1 in previous steps, the candidate symptom set S2 comprises Symptom 2, Symptom 3, Symptom 4, Symptom 5, and Symptom 6. If the predicted professional on Symptom 5 is higher than the predicted professional on each of Symptom 2 and Symptom 3, then whether the user has Symptom 5 will be inquired with the user using the language pattern selected based on the predicted professional on Symptom 5. If conversation system 400 determines the user has Symptom 5 based on further inputs from the user, then the user is determined by conversation system 400 to have disease C. If conversation system 400 determines the user does not have Symptom 5, conversation system 400 continues to inquire with the user whether the user has other Symptoms.

In some other embodiments, the entropy of a disease in the set D can be calculated using the following formula: $E = \sum_{i=1}^{n} PD_i * \log PD_i$, wherein E is the entropy of a disease set (for example, set D comprising diseases $D_1, D_2, \ldots, D_n$,), $PD_i$ is possibility of disease $D_i$ in the set D ($1 \leq i \leq n$), and n is the number of diseases in set D. The possibility of a disease $PD_i$ can be determined based on the relationships between diseases and symptoms. For example, the possibility of a disease $PD_i$ can be a reciprocal of the number of all possible diseases. In the example of Table 4, Diseases A, B, C or D possibly appears, and their possibility can respectively be calculated as 1/4, and the entropy of disease set D (comprising Diseases A, B, C and D) can be calculated as E=2.

Depending on whether the user has the further symptom, possible disease set D (comprising Diseases A, B, C, and D) can be divided to a plurality of subsets, for example, subsets $D_1$ (diseases relate to the further symptom) and $D_2$ (diseases do not relate to the further symptom). In the example of Table 4, if the further symptom is Symptom 2, the subset $D_1$ can comprise Disease A and Diseases B, and the subset $D_2$ can comprise Disease C and Disease D. If the further symptom is Symptom 3, the subset $D_1$ can comprise Disease A, and the subset $D_2$ can comprise Disease B, C and Disease D. If the further symptom is Symptom 4, the subset $D_1$ can comprise Disease B, and the subset $D_2$ can comprise Diseases A, C, and D. If the further symptom is Symptom 5, the subset $D_1$ can comprise Disease C, and the subset $D_2$ can comprise Diseases A, B, and D. If the further symptom is Symptom 6, the subset $D_1$ can comprise Disease D, and the subset $D_2$ can comprise Diseases A, B, and C.

For example, if Symptom x will be selected as the further symptom, an entropy deduction can be calculated as:

$$E_{symptom\ x} = E - \sum_{i=1}^{m} \frac{Count(D_i)}{Count(D)} * entropy(D_i),$$

wherein $E_{symptom\ x}$ represent the entropy deduction for Symptom x, m is the number of subsets if Symptom x is the further to be inquired with the user, $Count(D_i)$ is the number of diseases in subset $D_i$ ($1 \leq i \leq m$), $Count(D)$ is the number of diseases in set D, $entropy(D_i)$ is the entropy of subset $D_i$.

Taking Symptom 2 as an example, the subset $D_1$ can comprise Disease A and Diseases B, and the subset $D_2$ can comprise Disease C and Disease D. Possibilities of Disease A and Diseases B in subset $D_1$ are respectively 0.5, and the possibilities of Disease C and Diseases D in subset $D_2$ are also respectively 0.5. The entropy deduction of Symptom 2 can be calculated as:

$$E_{symptom\ 2} = 2 - \left(\frac{2}{4} * entropy(D_1) + \frac{2}{4} * entropy(D_2)\right) = 1.$$

In this example, entropy deductions for Symptom 3, Symptom 4, Symptom 5, and Symptom 6 can also be respectively calculated as: $E_{symptom\ 3}$=0.81, $E_{symptom\ 4}$=0.81, $E_{symptom\ 5}$=0.81, $E_{symptom\ 6}$=0.81.

A symptom of which the entropy deduction is larger than a preset threshold can be selected as the further symptom to be inquired with the user in the current pre-diagnosis period. For example, if the entropy deduction of Symptom 2 is larger than the preset threshold, symptom 2 can be selected as the further symptom. Then symptom 2 will be inquired by conversation system 400 using the language pattern selected in previous steps. In some other examples, if the entropy deduction of a candidate symptom is larger than the entropy deduction of any other symptom in the candidate symptom set S2, the symptom can be selected as the further symptom.

In some other examples, the further symptom is determined based on the entropy deductions of candidate symptoms and predicted professional levels of the user on the candidate symptoms. For example, if a predicted professional level of the user on a candidate symptom and the entropy deduction of the candidate symptom respectively meets a preset criterion, the candidate symptom can be selected as the further symptom in the current pre-diagnosis period.

As another example, if the entropy deduction of Symptom 2 is larger than a preset threshold (or larger than the entropy deduction of any other symptom in the candidate symptom set S2), and the predicted professional levels of the user on Symptom 2 is larger than another preset threshold (or larger than the predicted professional levels of the user on any other candidate symptom), Symptom 2 can be selected as the further symptom.

In some other examples, the predicted professional levels of the user on the symptoms can be used in the calculation of entropy deductions of symptoms. If a predicted professional level of the user on a first symptom is larger than a predicted professional level of the user on a second symptom, the entropy deduction of the first symptom can be weighted with a coefficient (for example, multiplied by the coefficient), which is larger than a coefficient applied to the entropy deduction of the second symptom. For example, an entropy deduction of Symptom 2 can be calculated as: $E_{symptom\ 2}$ multiplied by the predicted professional levels of the user on Symptom 2. It shall be understood that any suitable coefficient can be applied by Conversation Content Generation Module 403. The further symptom will be determined based on the weighted entropy deductions of candidate symptoms.

According to embodiments of the invention, the above-mentioned methods may also be applied in conversation systems that provide other types of advice, such as technique advice, legal advice, insurance or banking advice, etc. Taking conversation systems that provide technique advice as an example, a professional level of a user on a specific technology field can be determined based on history conversation data, and then a conversation content for further inquiry can be generated for the user based on the professional level of the user on the specific technology field.

Figure 7:
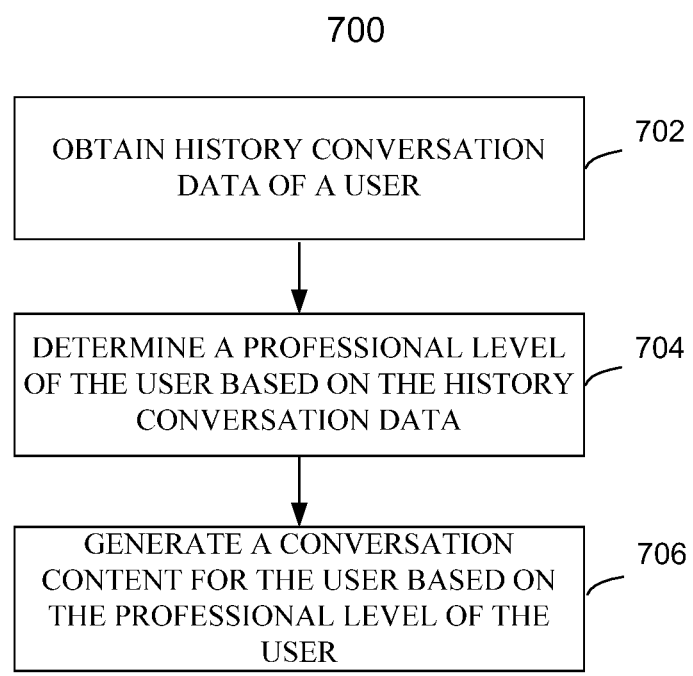
FIG. 7 depicts a flow chart of an example computer-implemented method facilitating generation of a conversation content in accordance with one or more embodiments described herein.

A computer-implemented method 700 that generates a conversation content according to an embodiment of the invention will be discussed with reference to FIG. 7. Method 700 can be implemented by computer system/server 12 of FIG. 1. Method 700 can also be implemented by conversation system 400. It shall be noted that method 700 is only illustrative and is not intended to suggest any limitation as to the scope of use or functionality of embodiments of the present invention described herein.

At step 702, history conversation data of a user is obtained. At step 704, a professional level of the user is determined based on the history conversation data. At then step 706, a conversation content is generated for the user based on the professional level of the user.

It should be noted that the processing of generating conversation contents based on user professional levels according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by a device operatively coupled to one or more processors, history conversation data of a user;
determining, by the device, a professional level of the user based on the history conversation data; and
generating, by the device, a conversation content for the user based on the professional level of the user, wherein the determining the professional level of the user based on the history conversation data comprises:
extracting, by the device, one or more symptoms from the history conversation data;
determining, by the device, one or more description sections used by the user for describing each of the one or more symptoms;
assigning, by the device, weights to the one or more description sections; and
calculating, by the device, a score for at least one of the one or more symptoms based on the weights, wherein scores for the one or more symptoms are used to represent the professional level of the user on the one or more symptoms.

2. The computer-implemented method of claim 1, wherein the assigning the weights to the one or more description sections comprises:
determining, by the device, whether a description section of the one or more description sections matches with a standard language pattern;
assigning, by the device, a first weight to the description section in response to the description section matching with the standard language pattern; and
assigning, by the device, a second weight to the description section in response to the description section not matching with the standard language pattern, wherein the first weight is greater than the second weight.

3. The computer-implemented method of claim 1, wherein a weighted sum of the scores for the one or more symptoms are used to represent the professional level of the user.

4. The computer-implemented method of claim 3, wherein a weight assigned to the score of a first symptom of the one or more symptoms is greater than a weight assigned to the score of a second symptom of the one or more symptoms, and the first symptom is more recent than the second symptom.

5. The computer-implemented method of claim 1, wherein the generating the conversation content for the user based on the professional level of the user comprises:
generating, by the device, the conversation content using a standard language pattern in response to the professional level of the user being greater than a defined threshold.

6. The computer-implemented method of claim 1, wherein the generating the conversation content for the user based on the professional level of the user comprises:
   predicting, by the device, professional levels of the user on one or more candidate symptoms based on the professional level of the user;
   determining, by the device, a further symptom from the one or more candidate symptoms; and
   generating, by the device, a description content for the further symptom based on a predicted professional level of the user on the further symptom, and wherein the conversation content comprises the description content for the further symptom.

7. The computer-implemented method of claim 6, wherein the generating the description content for the further symptom comprises:
   generating, by the device, the description content using a standard language pattern in response to the predicted professional level of the user on the further symptom being greater than a preset threshold.

8. The computer-implemented method of claim 1, wherein the extracted one or more symptoms comprise one or more symptoms of diseases.

9. A computer system comprising:
   a memory that stores computer executable components; and
   a processor, operably coupled to the memory, and that executes the computer executable components stored in the memory, wherein at least one of the computer executable components:
   obtains history conversation data of a user;
   determines a professional level of the user based on the history conversation data; and
   generates a conversation content for the user based on the professional level of the user, wherein the determination of the professional level of the user based on the history conversation data comprises:
      extraction of one or more symptoms from the history conversation data;
      determination of one or more description sections used by the user for describing each of the one or more symptoms;
      assigning weights to the one or more description sections; and
      calculation of a score for at least one of the one or more symptoms based on the weights, wherein scores for the one or more symptoms are used to represent the professional level of the user on the one or more symptoms.

10. The computer system of claim 9, wherein the assigning the weights to the one or more description sections comprises:
   determination of whether a description section of the one or more description sections matches with a standard language pattern;
   an assigning a first weight to the description section in response to the description section matching with the standard language pattern; and
   an assigning a second weight to the description section in response to the description section not matching with the standard language pattern, wherein the first weight is greater than the second weight.

11. The computer system of claim 9, wherein the generation of the conversation content for the user based on the professional level of the user comprises:
   generation of the conversation content using a standard language pattern in response to the professional level of the user being greater than a preset threshold.

12. The computer system of claim 9, wherein the generation of the conversation content for the user based on the professional level of the user comprises:
   prediction of professional levels of the user on one or more candidate symptoms based on the professional level of the user;
   determination of a further symptom from the one or more candidate symptoms; and
   generation of a description content for the further symptom based on a predicted professional level of the user on the further symptom, and wherein the conversation content comprises the description content for the further symptom.

13. The computer system of claim 12, wherein the generation of the description content for the further symptom comprises:
   generation of the description content using a standard language pattern in response to the predicted professional level of the user on the further symptom being greater than a defined threshold.

14. A computer program product facilitating generation of conversation contents based on user professional levels, the computer program product comprising a non-transitory computer readable storage medium having program instructions embodied therewith, the program instructions executable by a processor to cause the processor to:
   obtain, by the processor, history conversation data of a user;
   determine, by the processor, a professional level of the user based on the history conversation data; and
   generate, by the processor, a conversation content for the user based on the professional level of the user, wherein a determination of the professional level of the user based on the history conversation data comprises:
      extraction of one or more symptoms from the history conversation data;
      determination of one or more description sections used by the user for describing at least one of the one or more symptoms;
      an assigning of weights to the one or more description sections; and
      calculation of a score for at least one of the one or more symptoms based on the weights, wherein scores for the one or more symptoms are used to represent the professional level of the user on the one or more symptoms.

15. The computer program product of claim 14, wherein the calculation of the weights of the one or more description sections comprises:
   determination of whether a description section of the one or more description sections matches with a standard language pattern of the one or more symptoms;
   an assigning a first weight to the description section in response to the description section matching with the standard language pattern; and
   an assigning a second weight to the description section in response to the description section not matching with the standard language pattern, wherein the first weight is greater than the second weight.

16. The computer program product of claim 14, wherein the generating the conversation content for the user based on the professional level of the user comprises:

generation of the conversation content using a standard language pattern in response to the professional level of the user being greater than a defined threshold.

17. The computer program product of claim 14, wherein the generation of the conversation content for the user based on the professional level of the user comprises:
   prediction of professional levels of the user on one or more candidate symptoms based on the professional level of the user;
   determination of a further symptom from the one or more candidate symptoms; and
   generation of a description content for the further symptom based on a predicted professional level of the user on the further symptom, and wherein the conversation content comprises the description content for the further symptom.

* * * * *